July 13, 1965

O. C. BEESON 3,193,951

GRUBBING MACHINE

Filed May 29, 1963

INVENTOR.
ORVILLE C. BEESON

BY
*Lockwood, Woodard, Smith & Weikart*
Attorneys

July 13, 1965  O. C. BEESON  3,193,951
GRUBBING MACHINE
Filed May 29, 1963  3 Sheets-Sheet 2
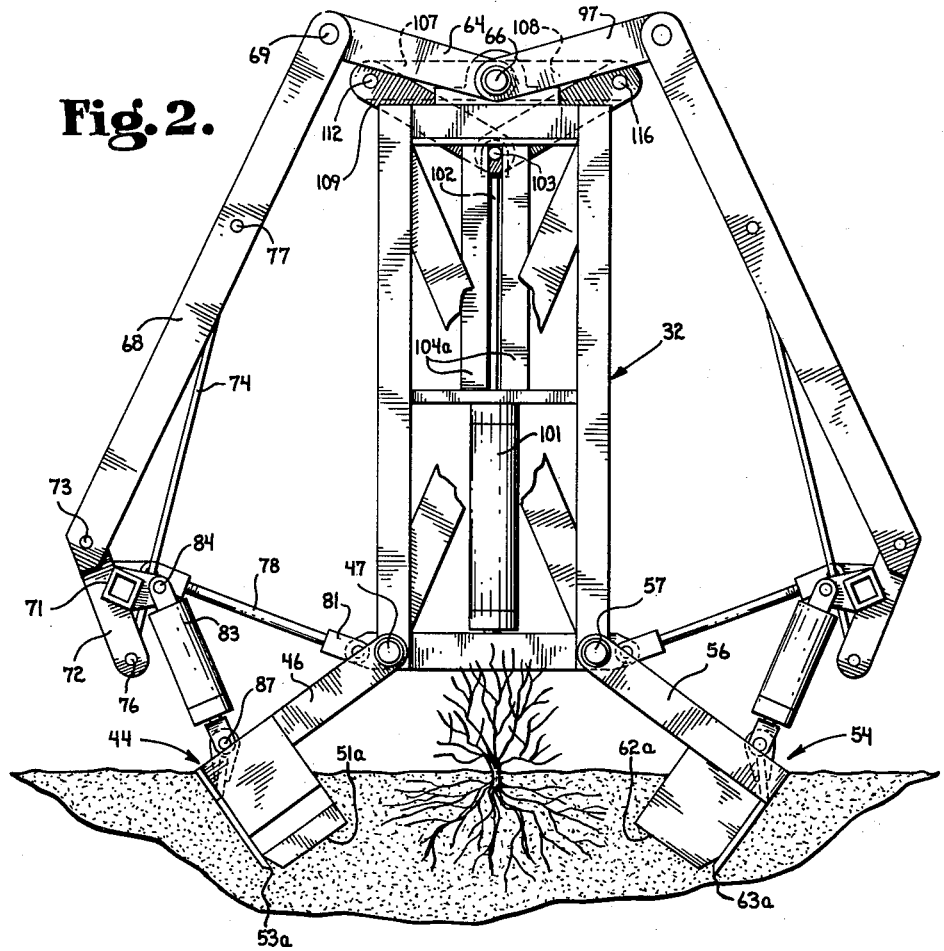
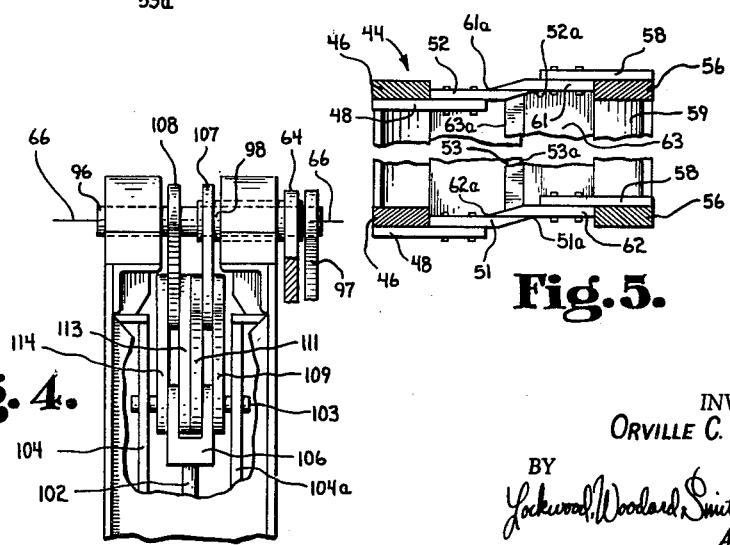
INVENTOR.
ORVILLE C. BEESON
BY
Lockwood, Woodard, Smith & Weikart
Attorneys

INVENTOR.
ORVILLE C. BEESON

3,193,951
GRUBBING MACHINE
Orville C. Beeson, R.R. 1, Summitville, Ind.
Filed May 29, 1963, Ser. No. 284,027
4 Claims. (Cl. 37—2)

This invention relates generally to agricultural machinery and more particularly to a device capable of bodily removing small bushes, trees, and stumps from a field.

It is well known that conventional agricultural implements cannot cope with much of the underbrush and assorted vegetable debris which commonly exists in uncultivated fields. In order to clear a field for planting and cultivation, it is frequently necessary to employ a track laying tractor with a dozer blade for the purpose of removing bushes, trees, stumps, and other debris. In many fields, the stumps, trees and shrubs are not large enough to require the power and size of the average track laying tractor for removal thereof. However, heretofore there has been no satisfactory means for removing such trees, shrubs and bushes.

It is therefore a general object of the present invention to provide a device for removing small trees, shrubs, bushes, stumps and other debris from a field.

A further object is to provide a device which is comparatively inexpensive, light in weight, efficient, and reliable in operation.

A still further object is to provide a device sufficiently low in cost to be owned by the average farmer who has some power operated mechanical equipment including a farm tractor.

A further object is to provide a device which can be employed with practically any vehicle having hydraulic supply means thereon.

A further object is to provide a device which is easily operated by the tractor operator, and which can be readily mounted to and dismounted from a conventional tractor.

Described briefly, a typical embodiment of the present invention includes an upright frame having means thereon by which the frame is mounted to a conventional three point trailer hitch on a tractor. A first servo motor, hereinafter referred to as servo, is mounted to the tractor and functions to elevate and lower the frame as desired.

Two cutters are provided. Each is mounted to an arm which is pivotally mounted to the frame, whereby the cutters may swing convergently in arcs below the frame. A second servo operates a link system for positioning the cutters initially. Third and fourth servos are connected to the cutters themselves for applying a high mechanical advantage to the cutters, once positioned, to complete a grubbing operation.

The full nature of the invention will be understood from the accompanying drawings and the following description and claims:

FIG. 2 is a rear elevational view of the machine of FIG. 1 with the tractor portion omitted, and illustrates the condition in which the tractor weight is applied to the machine to initiate penetration of its cutters into the ground.

FIG. 4 is an enlarged fragmentary left-hand side elevation illustrating details of the positioning arm drive mechanism when the arms are in the position shown in FIG. 3.

FIG. 5 is an enlarged fragmentary top plan view of the cutters in closed condition.

Figure 1:
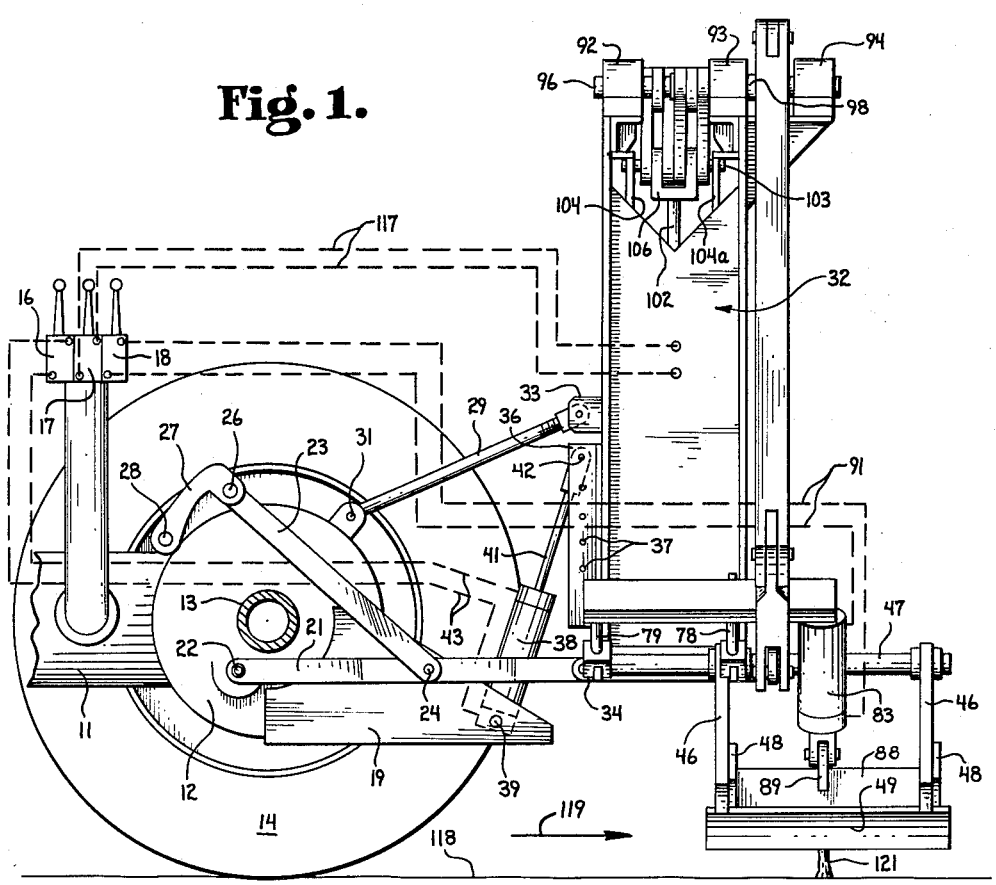
FIG. 1 is a left-hand side elevation of a typical embodiment of the present invention, the tractor portion being shown only fragmentarily and with the left rear wheel removed to permit illustration of certain details.

Referring to the drawings in detail, the tractor, a portion of which is shown schematically, includes a combined frame and housing 11 with a conventional differential housing 12 at the rear end thereof from which the axle tubes 13 extend transversely for support by the wheels, the right rear wheel 14 being shown in the drawing. The tractor may be considered to have a source of hydraulic fluid under pressure coupled to three valve assemblies 16, 17, and 18 which may be conventional two way valves.

A loading servo support member 19 is affixed to the differential housing 12. Two drag links 21 are provided, with each being pivotally mounted to the differential housing at 22. For each drag link there is a lift link 23 pinned at 24 to the drag link with the upper end of the lift link being pinned at 26 to a lift arm 27 having a shaft 28. The shaft 28 may be coupled to conventional hydraulic three point hitch control means (not shown) for applying power to the shaft to raise the drag link when desired, and remove power from the shaft to allow the drag links to drop when desired. If desired however, the lift links 23 typically provided in conventional hydraulically operable three-point hitches, can be disconnected entirely, as they are not necessary to achieve proper operation of the machine of the present invention.

An adjustable link 29 is pinned at 31 to the differential housing and is made in two parts. The rear portion is threadedly received in the forward portion to accommodate variation in the length of the link.

A generally upstanding frame 32, may be conveniently constructed of welded steel plates, strips, and sections. A bracket 33, to which the link 29 is pinned, is secured to the frame. Two brackets 34, to which the drag links 21 are pinned, are also secured to the frame. A vertical strip 36 is affixed to the front of the frame and includes a plurality of vertically spaced apertures 37.

A loading servo means is provided in the form of a hydraulic cylinder 38 pivotally mounted by means of the pin 39 to the loading servo support 19. The servo rod 41 extending from the upper end of the servo cylinder is pinned at its upper end to the rail 36 on the frame, the pin 42 is being used for this purpose. The servo is double acting and two hydraulic lines 43 are connected to the valve 16 to provide the hydraulic supply and return for the cylinder. It should be understood at this point, that while hydraulic servos are used throughout, other types of servos including electrical and pneumatic can be used if the circumstances warrant it.

Operation of the valve 16 is effective to raise and lower the frame 32 of the grubbing machine as desired. The initial positions of the frame are determinable by the particular one of the holes 37 in the rail 36 which is used to fasten the upper end of the servo rod 41.

There are two cutters provided on the illustrated machine. Cutter 44 is connected by a pair of cutter arms 46 to the cutter arm support shaft 47 which is mounted to the frame 32 adjacent the lower marginal edge thereof. The cutter arms are attached to the shaft by suitable bearing means and are, therefore, pivotally mounted to the frame and permit swinging movement of the cutter.

Some details of the cutters can be most easily seen in FIG. 5. The cutter 44 includes cutter side plates 48 and a cutter floor plate 49, and these may be welded or bolted to the arms 46. The cutter includes first and second cutter side knives 51 and 52 respectively, and the cutter cross knife 53. The cutter side knives are secured by bolts to the cutter side plates and the cutter cross knife is bolted to the cutter floor plate.

Figure 3:
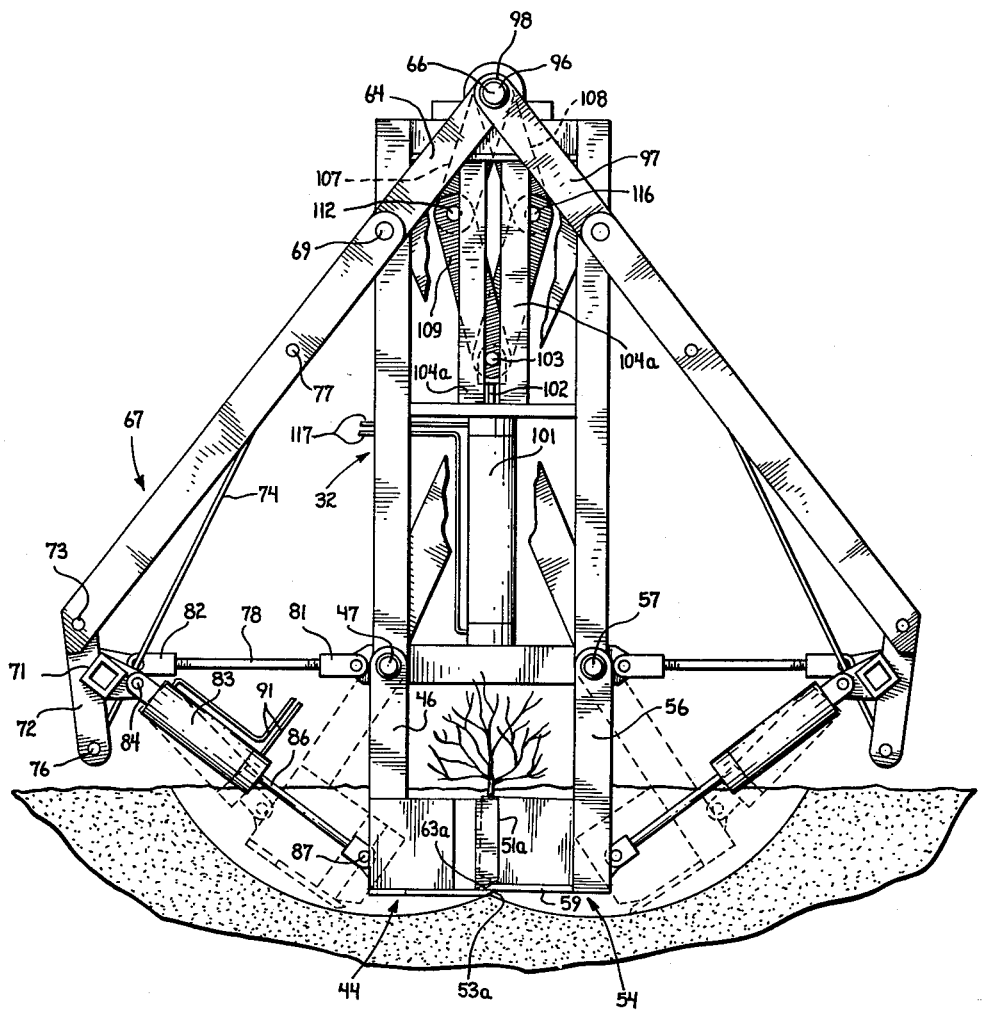
FIG. 3 is a rear elevational view thereof illustrating by the solid outlines, the final position of the cutters at the end of their final drive stroke, and illustrating by dotted outlines the position of the cutters at the commencement of the final closing action.

As is apparent in FIGURES 1 and 5, the cutter side plates 48 are mounted on the rear faces of the cutter arms 46. The cutter side knives 51 and 52 are mounted on portion of the front faces of the cutter side plates and are sharpened so that the cutting edges 51a and 52a thereof are tangent the front faces of the knives. As can be seen in FIGURES 2 and 3, the cutter cross knife is sharpened so that the cutting edge 53a thereof is tangent the upper face of the knife.

The construction of the other cutter 54, and its mounting to the frame 32, are identical to that provided for the cutter 44 except that the cross knife is inverted so that cutting edge 63a is tangent the lower face of the knife. It follows that the cutter arms 56 mounted on the support shaft 57 are aligned with the cutter arms 46. The cutter side plates 58 are mounted to the front faces of the arms 56 and the cutter floor plate is secured to the lower marginal edges of the cutter side plates 58. The cutter side knives 61 and 62 are mounted to the rear faces of the cutter side plates 58. The cutting edges 61a and 62a of the cutter side knives 61 and 62 respectively, are tangent the rear faces of the knives. The cutter cross knife 63 is sharpened so that its cutting edge 63a is tangent its lower face.

As can be seen in FIGURES 5 and 3, this construction permits the operation of the cutters such that when they converge, the cutting edges of cutter 44 pass immediately adjacent the cutting edges of the cutter 54 to assure a positive easy cutting action. Moreover, this construction permits substantial duplication of parts for both right hand and left hand cutter assemblies 54 and 44 respectively, though the cross knives are inverted.

For each of the cutters, there is provided a positioning and driving mechanism. Because those for both of the cutters are very much alike, the mechanism for cutter 44 will be described at the outset, and the differences between that for cutter 44 and that for cutter 54 will then be described. A positioning arm 64 is pivotally mounted to the frame 32 for rotation on a longitudinally extending horizontal axis 66. A positioning link assembly 67 is provided, and includes the positioning link 68 pivotally connected to the arm 64 by the pin 69. A bar 71 is affixed to a hanger 72 which is connected by a pin or bolt to the positioning link 68. A tie rod 74 is connected to the lower end of the hanger 72 by the bolt or pin 76 and is connected to the link 68 by the bolt or pin 77. The hanger 72 and tie rod 74, being connected to the link 68 by pins or bolts, provide a rigid triangular structure.

Two guide links 78 and 79 are pinned to the sides of the frame 32 adjacent the lower marginal edge thereof and are also pinned to brackets affixed to the bar 71. Clevis 81 and clevis 82 are provided at opposite ends of each of the guide links. They are threadedly received on the rod portion of the guide link which has a right hand thread at one end and a left hand thread at the other end, thereby providing a turnbuckle effect. This permits adjustment of the length of the guide link which, as will be seen, permits adjustment of original positioning of the cutter.

A cutter drive servo is shown in the form of a hydraulic cylinder 83 pinned at 84 at its outer end to the bar 71. The cutter drive servo rod 86 is pinned to the outside margin of the cutter 44. There is a bar 88 and lug 89 affixed to the cutter for this purpose. The servo is a double acting type connected by a pair of hydraulic lines 91 to the valve 18.

The mechanism for positioning and actuating cutter 44, and which has been described to this point, is identical to that employed for positioning and driving the cutter 54. There are, however, some differences of construction between the remaining mechanism to be described. There are three pillow blocks 92, 93, and 94 mounted to the frame 32. A shaft 96 extends through and is supported directly by the pillow blocks 92 and 94. The positioning arm 97 for cutter 54 may be keyed or splined to this shaft in a manner whereby rocking of the shaft causes swinging of the arm 97. A sleeve 98 encircles the shaft 96 and is supported by the pillow block 93. The sleeve 98 is free to rock independently of the shaft 96.

Positioning servo means are provided in the form of a hydraulic cylinder 101 mounted in the frame 32 and having a piston rod 102 extending vertically from the top of the cylinder. In FIG. 2 the piston rod is shown substantially extended from the cylinder, while in FIG. 3, it is shown retracted. A pin 103 is connected to the upper end of the piston rod 102 and its vertical travel is guided by two pairs of guide rails 104 and 104a disposed in vertical planes lying ahead of and behind the cylinder 101. The guide rails 104 and 104a are secured to the frame 32. To conveniently attach the pin 103 to the positioning servo rod 102, a yoke 106 is provided at the top end of the rod and is secured thereto.

A sleeve operating arm 107 may be keyed or splined to the sleeve 98, whereby swinging of the arm 107 with respect to the axis 66 will turn the sleeve and accordingly swing the positioning arm 64. A shaft operating arm 108 may be keyed or splined to the shaft 96 to turn the shaft, and thereby swing the positioning arm 97 when the shaft operating arm 108 is swung with respect to the axis 66.

Two drive links 109 and 111 are connected to the yoke 106 by means of the pin 103 and are connected to the sleeve operating arm 107 by the pin 112. Similarly, two links 113 and 114 are connected to the yoke 106 by the pin 103 and are connected to the shaft operating arm 108 by means of the pin 116. Therefore, when the positioning servo rod is drawn into the cylinder from the position shown in FIG. 2, the operating arm drive links 109, 111, 113 and 114 pull the sleeve and shaft operating arms 107 and 108 respectively in arcs pivoting on the axis 66. This action swings the positioning arm 64 in a counter-clockwise direction when viewed from the rear and swings the positioning arm 97 in a clock-wise direction when viewed from the rear.

The positioning servo is double acting so that the reverse function can also be effected. Two hydraulic lines 117 are connected to the control valve 17 whose alternate positions will supply hydraulic fluid alternately to the upper and lower sides of the servo piston to lower and raise, respectively the position servo rod 102.

It should be understood, of course, that details of construction departing somewhat from those illustrated can be employed within the overall scope of the invention. As just one example, the bar 71 need not be a steel tube of square cross section. Also it will be apparent that the arms driving and being driven by the shaft and sleeve 96 and 98, respectively, need not be affixed thereto. They can be keyed, splined, or otherwise attached to these members in order to prevent relative rotation therebetween.

*Operation*

In the operation of the present invention, the cutter mechanism is normally carried about on the tractor in the attitude shown in FIG. 1 where the cutters are above the ground surface 118 at a sufficient elevation to allow convenient maneuvering of the tractor through a field. In order to remove a small bush, for example, the tractor is backed in the direction of the arrow 119 until the cutters are positioned with the stalk or trunk 121 of the bush centrally located therebetween. The valve 16 is then actuated to move the loading servo rod 41 into the cylinder 38 which lowers the frame 32 and therefore the cutters therewith. Continued retraction of the rod will engage the cutters with the ground surface and cause them to cut into the ground as the servo tends to support the rear end of the tractor on the cutters. This condition of the cutters is shown in FIGURE 2.

When retraction of the rod 41 is complete, the valve 17 is switched to withdraw the positioning servo rod 102 into the cylinder. This causes the positioning arm 64 to turn in a counter-clockwise direction from the position shown in FIG. 2 to the position shown in FIG. 3. Similarly, the positioning arm 97 is pulled in a clockwise direction from the position shown in FIG. 2 to the position shown in FIG. 3. When this occurs, the positioning link assemblies move the cutter drive cylinder mounting bars downwardly and inwardly in an arc controlled by the guide links 78 thereby placing the cutters in the position shown by the dotted outline in FIG. 3. They have therefore moved inwardly toward the root system of the bush and are positioned for the final phase of the grubbing operation.

At this time the control valve 18 is switched to apply pressure in the cylinders 83 to extend their rods and drive the cutters together to the position shown in FIG. 3. In this position, the knife edges have efficiently cut the straggling roots, if any, and the disposition of the knives is shown in FIG. 5 as well as in FIG. 3. The valve 16 may then be switched to extend the rod 41 of the loading servo to elevate the frame and pick the bush out of the ground. The tractor may then be moved along to deposit the bush elsewhere. After deposit of the bush, the machine can be moved to the next bush or stump or other debris for removal thereof.

By making the length of link 29 adjustable, the angle of the frame 32 with respect to the tractor, and therefore the attitude of the knives with respect to the ground, can be changed if desired.

It can be seen from this description that the present invention is well suited to achieve the objects set out herein as well as other objects not specifically mentioned. It can conveniently employ practically any wheel borne vehicle regardless of whether it is a track laying type or one in which the wheels contact the ground directly.

Figure 6:
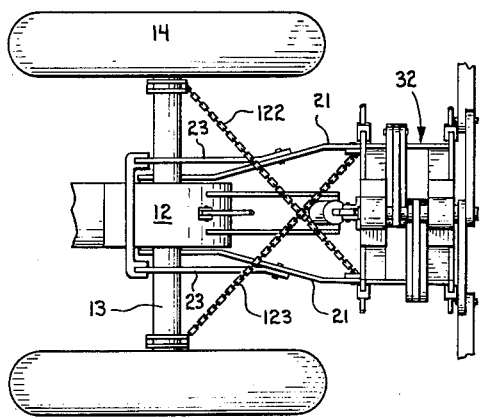
FIG. 6 is a schematic top plan view illustrating an arrangement of stabilizing chains for purposes which will become apparent.

Referring to FIG. 6, which is a schematic top plan view of the illustrated embodiment, a chain 122 is connected from the right rear axle housing to the frame 32 adjacent the left front lower margin thereof. A chain 123 is connected from the left rear axle housing 13 to the frame 32 adjacent the right front lower margin thereof. This crossing arrangement of chains supplements the tractor hitch in supporting the frame 32 against uneven side loads which can occur where the cutters encounter unequal resistance.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

I claim:
1. A machine comprising:
a frame;
a pair of cantilever shafts projecting rearwardly from said frame and spaced apart to permit receipt of a shrub or the like between said shafts;
a pair of cutting members spaced apart to permit receipt of a shrub or the like therebetween, each cutting member being pivotally mounted to one of said shafts, whereby said cutting members are swingably mounted to said frame for movement in arcs to and from a meeting position;
servo means connected to said frame and said cutting members to drive said cutting members to said meeting position;
each of said cutting members having blades lying in side-by-side engaging relation to corresponding blades of the other of asid cutting members when said cutting members are in meeting position, whereby said cutting members are adapted to cut off a shrub during movement to said meeting position,
two of the blades of each cutting member lying in spaced parallel planes perpendicular to the axes of said arcs, said two blades of each cutting member being sharpened such that the cutting edges thereof move in planes immediately adjacent the planes of movement of cutting edges of the other cutting member.

2. A machine comprising: a frame; bearing means on said frame supporting a shaft and a sleeve coaxially, said shaft being turnable independently of said sleeve; a first operating arm mounted to said sleeve and a second operating arm mounted to said shaft; a servo mounted on said frame and having an operator linked to said first and second operating arms to simultaneously turn said shaft and sleeve in opposite rotational senses; first and second cutter members pivotally mounted to said frame; a first positioning arm connected to said sleeve and swingable by said sleeve in a plane perpendicular to the axis of said sleeve; a second positioning arm connected to said shaft and swingable by said shaft in a plane perpendicular to the axis of said shaft; a first positioning link connected to said first positioning arm and a second positioning link connected to said second positioning arm; a second servo connecting said first positioning link to said first cutter member; and a third servo connecting said second positioning link to said second cutter member; said first servo being operable through said links, said operating arms, said positioning arms and said second and third servos to establish positions of said cutter members, and said second and third servos operating to drive said cutter members convergently from said positions.

3. A machine as set forth in claim 2 and further comprising: wheel borne support means, said frame being movably mounted thereto; a fourth servo connected to said support means and to said frame to change the position of said frame relative to said support means.

4. A machine as set forth in claim 3 wherein each of said cutter members has a pair of blades with cutting edges operable in parallel planes, and the cutting edges of the blades of one of said cutting members move in planes immediately adjacent planes of motion of cutting edges of the blades of the other cutting member; and each of said cutting members has a cross blade, the cutting edges of said cross blades being positioned parallel to the pivotal axes of said cutting members and at distances with respect to the pivotal axes of said cutting members to accommodate passage of the cutting edge of one cross blade immediately adjacent the cutting edge of the other cross blade as said edges move around said pivotal axes.

References Cited by the Examiner
UNITED STATES PATENTS

| | | | |
|---|---|---|---|
| 2,482,950 | 9/49 | Toftey | 37—2 |
| 2,505,923 | 5/50 | Taylor | 37—2 |
| 2,549,476 | 4/51 | Johnson | 37—2 XR |
| 2,599,617 | 6/52 | Davis | 172—450 X |
| 2,674,385 | 4/54 | Strauth. | |
| 2,743,656 | 5/56 | Fraga | 172—450 X |
| 2,828,038 | 3/58 | Dorkins | 37—187 X |
| 3,045,368 | 7/62 | Whitcomb | 37—2 |

CHARLES E. O'CONNELL, Primary Examiner.
BENJAMIN HERSH, Examiner.